Nov. 22, 1966 A. A. TUSZYNSKI 3,287,620
CHOPPER CIRCUIT
Filed June 13, 1962 2 Sheets-Sheet 1

INVENTOR.
ALFONS A. TUSZYNSKI
BY
Bean, Brooks, Buckley & Bean
ATTORNEYS

Nov. 22, 1966 A. A. TUSZYNSKI 3,287,620

CHOPPER CIRCUIT

Filed June 13, 1962 2 Sheets-Sheet 2

INVENTOR.
ALFONS A. TUSZYNSKI
BY
Bean, Brooks, Buckley & Bean.
ATTORNEYS 3,287,620
CHOPPER CIRCUIT
Alfons A. Tuszynski, Buffalo, N.Y., assignor, by mesne assignments, to Esterline-Angus Instrument Company, Inc., Indianapolis, Ind., a corporation of Delaware
Filed June 13, 1962, Ser. No. 202,327
5 Claims. (Cl. 321—44)

This invention relates to novel chopper circuitry and in particular pertains to a semiconductor chopper circuit encompassing means avoiding the necessity for complex circuitry to overcome the offset voltage characteristics of semiconductors.

It is desirable, in connection with choppers used for D.C. amplification, to isolate the D.C. input signal from ground and the A.C. output. Further, in semiconductor choppers when the semiconductor is used to periodically shunt the D.C. signal to zero potential, it is desirable to overcome the offset voltage characteristic of semiconductors, to thereby assure that the D.C. signal is, when shunted, at zero potential. In so overcoming the offset voltage characteristics of semiconductor switches while still maintaining the D.C. signal isolated from ground and the A.C. output, complex circuitry is the normal resort. It is, therefore, of principal concern in connection with the present invention to obtain rather simple circuitry for obtaining the above general objectives whereby the semiconductor chopper characteristically provides reduction in the effects of temperature drift and switching transients.

Generally speaking, the present invention employs the use of two semiconductor switches of opposite conductivity type providing parallel paths, when closed, to a source of zero potential. By this arrangement, the semiconductors can be connected by a voltage divider across which a positive-to-negative voltage drop occurs by virtue of the offset voltages of the two semiconductors. Therefore, a point of zero potential can be obtained on the voltage divider to which the D.C. input signal can be applied. Stated another way, the invention envisages an application wherein the offset voltages of a pair of semiconductors may be used, through a voltage divider, to obtain a reference point of zero potential when the semiconductors, acting as switches, are closed.

Other objects and advantages of the invention will appear from the description hereinbelow and the accompanying drawing wherein.

Figure 1:
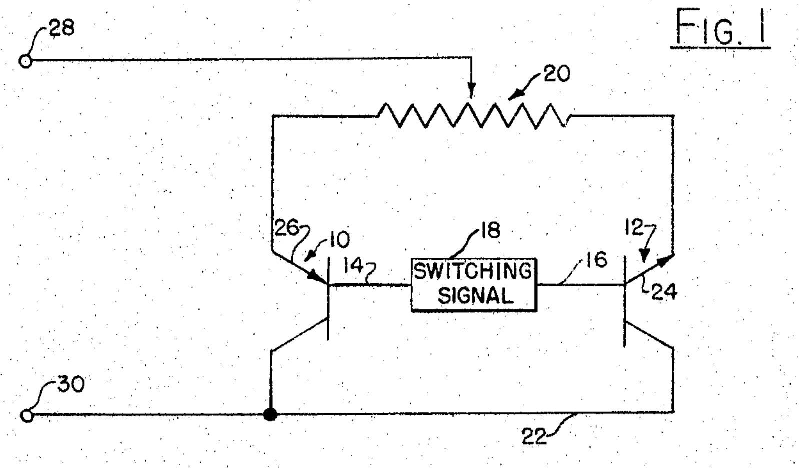
FIG. 1 is a circuit diagram illustrating the principles of the present invention.

Reference is had at this time to FIG. 1 wherein the basic principles of the present invention are illustrated. As shown, the semiconductor chopper according to this invention comprises a pair of semiconductors 10 and 12 of opposite conductivity type. The base electrodes 14 and 16 are connected to suitable switching signal means 18 whereby the two semiconductors 10 and 12 are rendered alternately conductive and non-conductive. The emitter-collector paths of the two semiconductors establish parallel paths between the opposite ends of the voltage divider means 20 and a source of ground or zero reference potential at the conductor 22. Thus, when the two semiconductor switches 10 and 12 are conductive, the emitter electrode 24 will be slightly positive with respect to the reference potential at 22 while the emitter electrode 26 will be slightly negative with respect to the reference potential by a result of the normal offset voltage characteristics of these semiconductors. Therefore, the left-hand end of the voltage divider means 20 will be negative while the right-hand end will be positive, with respect to the reference potential. Consequently, there will be some point along the voltage divider means which will be at zero potential and at this point it is desirable to apply the D.C. signal source to the chopper circuit. For this purpose, the voltage divider 20 may conveniently take the form of a potentiometer having a movable contact connected to one of the D.C. input terminals 28 and 30, as shown.

By utilizing the above chopper circuit, it will be evident that the condition is met for achieving zero potential when the semiconductor switches are closed by relatively simple circuitry configuration. The circuit shown in FIG. 1 incorporates an absolute null-setting device although no external sources of electromotive force are used; D.C. isolation of the input signal is maintained.

Figure 2:
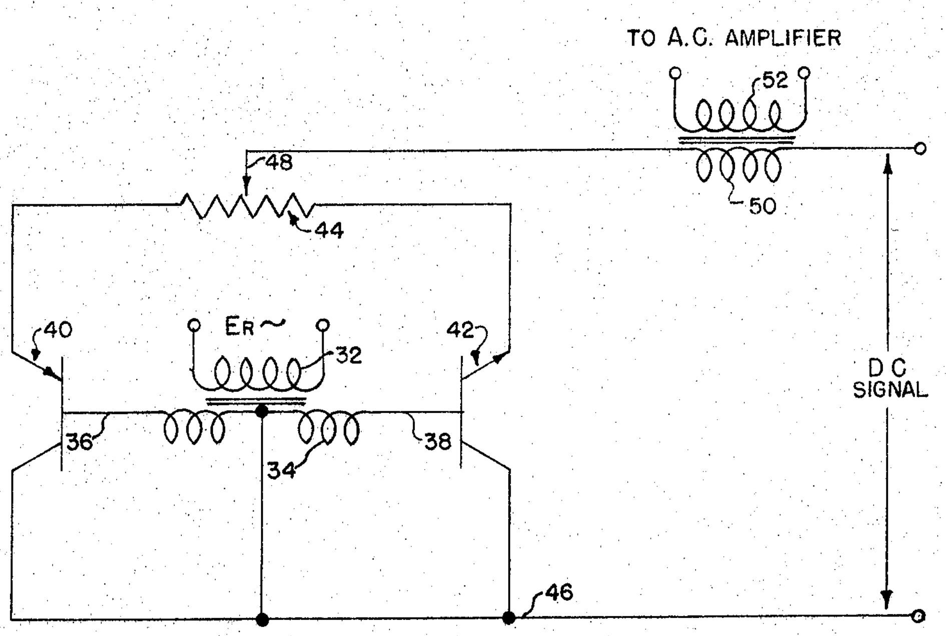
FIG. 2 is a preferred embodiment of the invention when used as a half wave circuit.

A preferred embodiment of the invention meeting the desired characteristics for a semiconductor chopper is illustrated in FIG. 2. In this figure, a half wave circuit is shown, gating being achieved by a suitable transformer having a primary 32 connected to a suitable source of alternating reference potential $E_R$ and the secondary 34 of which is connected between the base electrodes 36 and 38 of the semiconductors 40 and 42. The emitter- collector paths of these semiconductors connect the opposite ends of the potentiometer 44 to zero reference potential conductor 46 and the movable contact 48 of the potentiometer is adjusted to zero potential as aforesaid. The output of the circuit is taken from the D.C. signal input path by means of a transformer having a primary 50 in series in the input path and a secondary 52 adapted for connection to a suitable A.C. amplifier.

Figure 3:
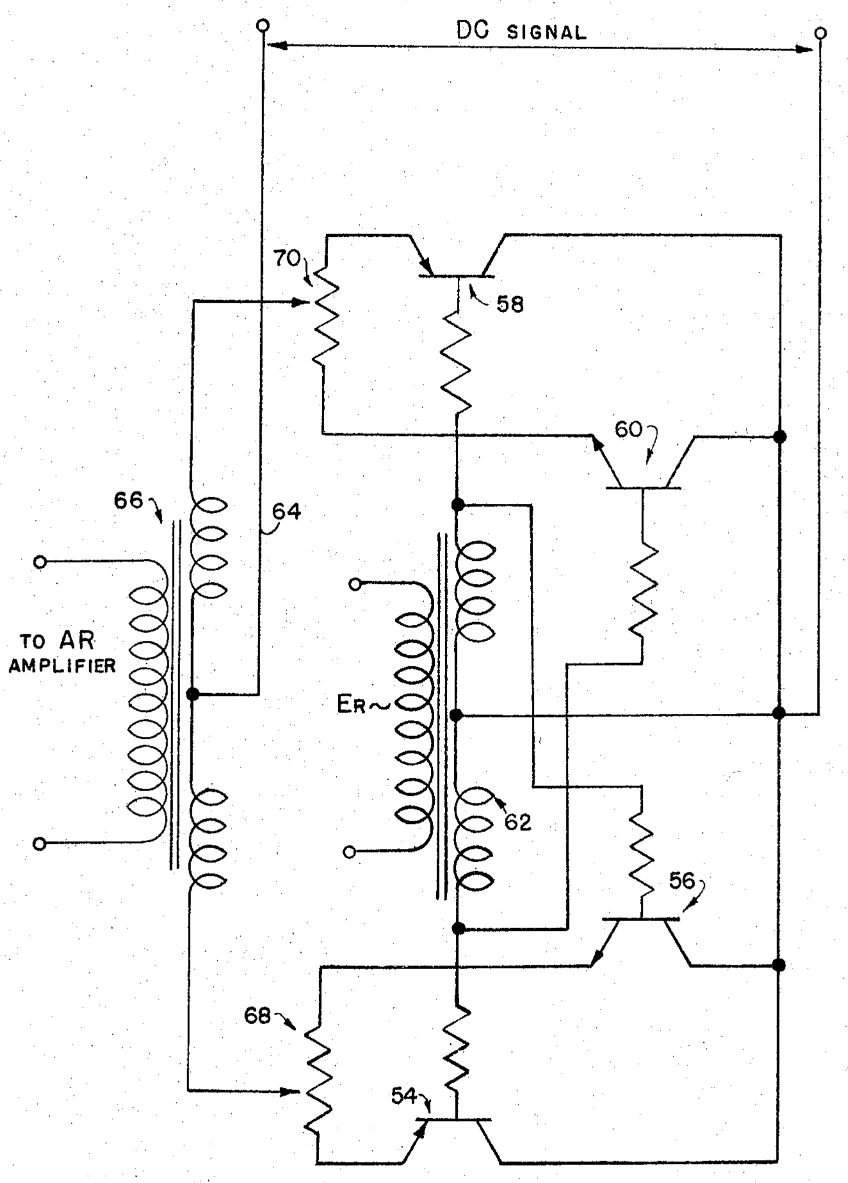
FIG. 3 is a preferred embodiment of a full wave circuit.

With reference to FIG. 3, the principles of this invention may be applied to a full wave circuit, as shown. In this case, a first pair of semiconductors 54 and 56 are simultaneously rendered conductive while a second pair of semiconductors 58 and 60 are simultaneously non-conductive, and vice versa, in accord with the base electrode bias provided by the gating signal $E_R$ through the transformer 62. The D.C. signal is applied through the center tap 64 of A.C. output transformer primary 66 and each of the transistor pairs is connected emitter-to-emitter by corresponding potentiometers 68 and 70. The principles of operation for each pair of opposite conductivity type semiconductors is identical with that described above in conjunction with FIG. 2.

In any case, not only is it possible to assure absolutely that the D.C. signal will be shunted to zero potential when the semiconductors are conducting, but as examination of FIG. 1 (for example) will show, noise due to switching transients will be minimized because every negative-going switching pulse on one of the transistors is associated with a positive-going pulse on the other transistor and vice versa.

It is to be understood that certain changes and modifications as illustrated and described may be made without departing from the spirit of the invention or the scope of the following claims.

What is claimed is:

1. In a chopper having a pair of conductors adapted for connection to a D.C. signal source,
   - a potentiometer having a movable tap connected to one of said conductors and having a resistive portion,
   - A.C. output load means connected to said movable tap,
   - semiconductor switching means connecting the opposite ends of said resistive portion to the other conductor only when said switching means is closed, and
   - means for alternately opening and closing said switching means,
   - said semiconductor switching means being effective, when closed, to apply voltages of opposite polarity to the opposite ends of said resistive portion whereby said movable tap may be positioned at a point on said resistive portion which is at zero potential when said semiconductor switching means is conducting, said A.C. output means being connected to said tap in such a manner as to be responsive to changes of current flow through said movable tap in response to operation of said switching means.

2. In a chopper circuit, a pair of semiconductor switches of opposite conductivity, resistor means, said semiconductor switches having their emitter-collector paths connected between the opposite ends of said resistor means and a source of reference potential to apply, when conductive, voltages of opposite polarity to the opposite ends of said resistor means, means for alternately rendering both said switches conductive and non-conductive, and, means for applying an input signal between a point on said resistor means and said reference potential, said point on said resistor means having a zero potential relative to said reference potential when said switches are both conducting, and means for coupling an A.C. load to said circuit in such a manner that said load is responsive to flow through said switches.

3. In a semiconductor chopper, a pair of input terminals, one of which is connected to a source of reference potential, a voltage divider, a first semiconductor switch of one conductivity type connecting one end of said voltage divider to said reference potential, a second semiconductor switch of conductivity type opposite to that of the first semiconductor switch connecting the other end of said voltage divider to said reference potential, the other of said input terminals being connected to said voltage divider at a point between the ends thereof, A.C. output load means connected between said other input terminal and said point on said voltage divider, means for periodically rendering both of said semiconductor switches conductive, said point on said voltage divider having a zero potential relative to said reference potential when said switches are both conducting.

4. In a chopper type D.C. amplifier, a pair of D.C. signal input terminals, one of which is connected to a source of zero reference potential, a signal output transformer having a primary connected in series with the other input terminal and having a secondary adapted for connection to an A.C. amplifier, and semiconductor chopper means connected in series between said transformer primary and said source of zero reference potential, said semiconductor chopper means comprising parallel switching paths, each switching path including resistor means and a semiconductor switch in series, the semiconductor switch of one path being of one conductivity type and the semiconductor which of the other path being of opposite conductivity type, each of said resistors being joined together at a junction point which is joined to said transformer primary, the junction point of the resistor means and the transformer primary being at zero potential when said switches are both conducting and, means for alternately (a) simultaneously opening said switching paths and (b) simultaneously closing said switching paths.

5. A chopper comprising, in combination, a pair of transistors of opposite conductivity type, each having a base, an emitter and a collector, means connected to the base of each transistor to periodically render both transistors conductive, voltage divider means, the emitter-collector path of one transistor connecting one end of said voltage divider means to a source of ground potential, and the emmiter-collector path of the other transistor connecting the opposite end of said voltage divider means to ground potential, whereby said one end of the voltage divider means is positive with respect to said ground potential and said opposite end of the voltage divider means is negative with respect to ground potential whenever said transistors are conductive, means for applying an input signal between ground potential and a point on said voltage divider means which is at said ground potential when said transistors are conductive, an output transformer having primary and secondary windings, the last mentioned means including said primary winding.

References Cited by the Examiner

UNITED STATES PATENTS

| | | | |
|---|---|---|---|
| 2,862,171 | 11/1958 | Freeborn | 321—45 |
| 3,007,103 | 10/1961 | Ehret | 321—45 |
| 3,047,790 | 7/1962 | Grosbaum et al. | 321—45 |
| 3,096,492 | 7/1963 | Vogt. | |
| 3,101,455 | 8/1963 | Masher. | |

OTHER REFERENCES

Electronics: "Complementary Transistors Simplify Modulator Design," Grau and Humbel, April 14, 1961; pp. 64–67.

Electronics: "Transistor Choppers for Stable D.C. Amplifiers," Bright and Kruper, April 1955; pp. 135–137.

JOHN F. COUCH, *Primary Examiner.*

LLOYD McCOLLUM, *Examiner.*

A. J. GAJARSA, M. WACHTELL, *Assistant Examiners.*